United States Patent [19]
de Rancourt de Mimerand et al.

[11] 4,274,782
[45] Jun. 23, 1981

[54] CLIP FOR CARRYING ARTICLES ENGAGING, DISENGAGING AND OVERLAPPING SYSTEM FOR SUCH A CLIP

[75] Inventors: Yvan de Rancourt de Mimerand; Jean Goullet, both of Paris, France

[73] Assignee: Hotchkiss-Brandt Sogeme H.B.S., Paris, France

[21] Appl. No.: 918,964

[22] Filed: Jun. 23, 1978

[30] Foreign Application Priority Data

Jun. 28, 1977 [FR] France ................. 77 19823

[51] Int. Cl.³ ............................. G07F 11/42
[52] U.S. Cl. ......................... 414/104; 414/107; 414/126; 221/312 A; 211/59.1; 248/214
[58] Field of Search ............ 414/330, 39, 107, 104, 414/125, 126, 129; 221/266, 277, 298, 312 A; 211/46, 54.1, 57.1, 59.1; 248/72, 214, 215, 228

[56] References Cited
U.S. PATENT DOCUMENTS

| | | | |
|---|---|---|---|
| 2,138,232 | 11/1938 | Giannini | 221/277 X |
| 3,189,185 | 6/1965 | Grasso | 211/59.1 |
| 3,796,324 | 3/1974 | Schmitz | 414/126 |

FOREIGN PATENT DOCUMENTS 2425487 12/1975 Fed. Rep. of Germany ...... 221/312 A

Primary Examiner—Robert W. Saifer
Assistant Examiner—Terrance L. Siemens
Attorney, Agent, or Firm—Cushman, Darby & Cushman

[57] ABSTRACT

A clip is provided for carrying articles and cooperates with system for engaging, disengaging and overlapping it. The clip is constituted by a thin piece of injected, stamped or moulded plastics material which is provided with a triangular opening which is itself open at a narrow slot in the center of the upper side of the clip and which may or may not have bosses to enable a regular spacing to be maintained between a number of clips which are carried by a storage rod before they are engaged onto a transfer or handling system. Such a clip is able to operate effectively with an engaging system which is formed by a dispenser and a member for thrusting the clip towards a system of abutments which thus enable the clip to move from a fixed support to a moving support. It is also to cooperate with a disengaging system having the structure of a forked cam which brings about the opposite movement, and finally with an overlapping system which enables the clips to be transferred from a low level to a high level or vice versa.

10 Claims, 22 Drawing Figures

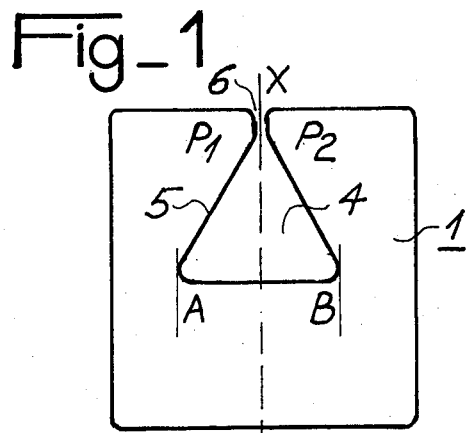
Fig_1
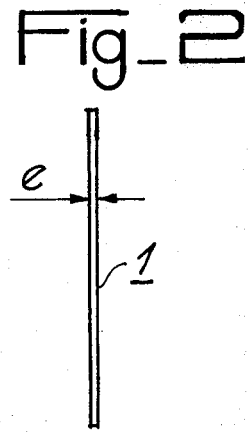
Fig_2
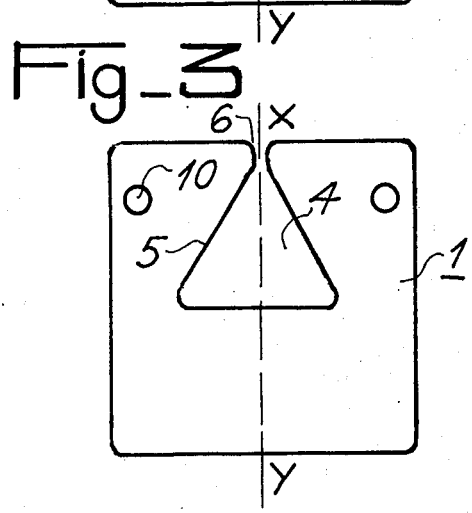
Fig_3
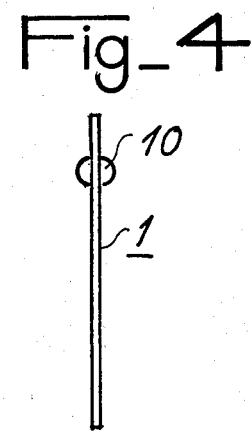
Fig_4
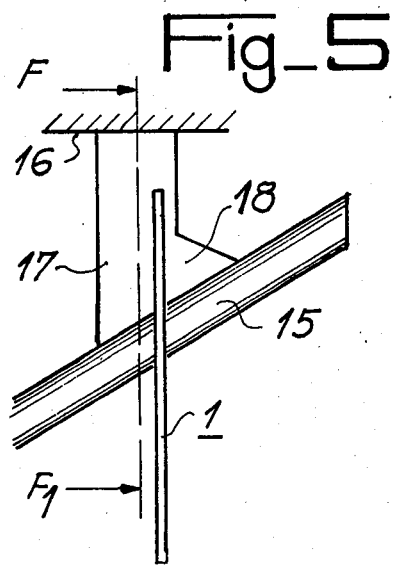
Fig_5
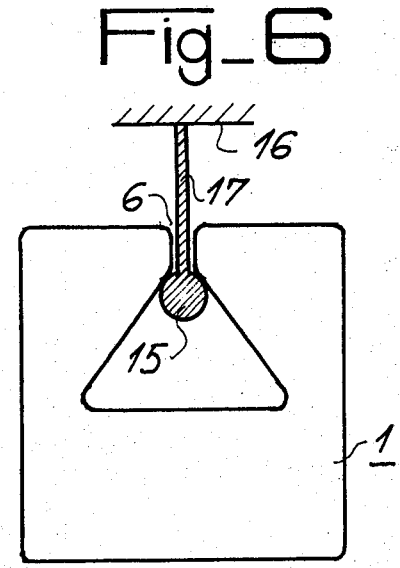
Fig_6

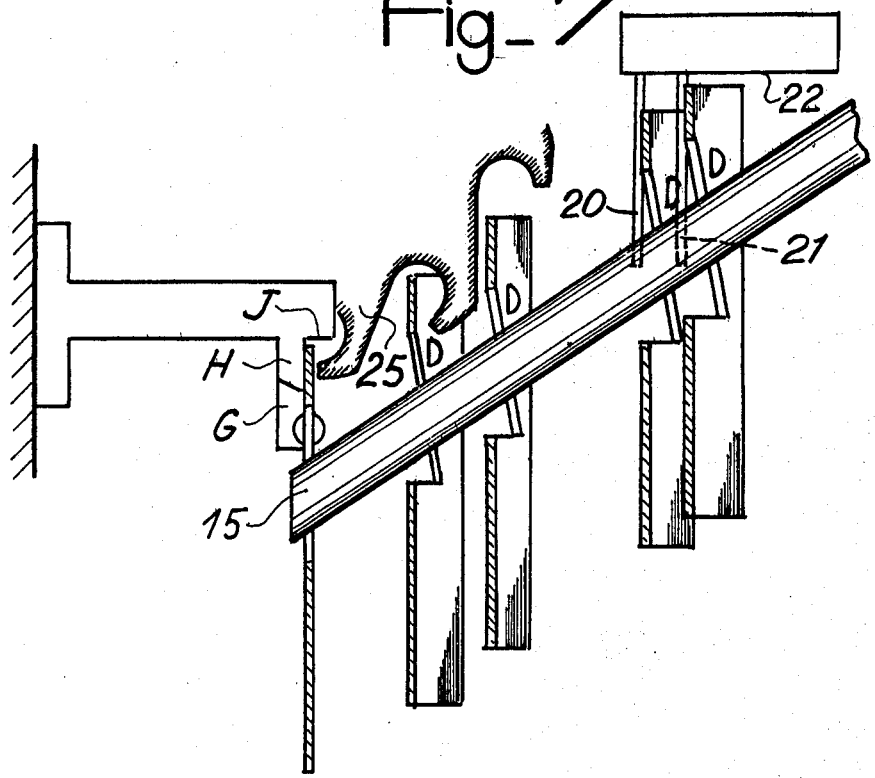
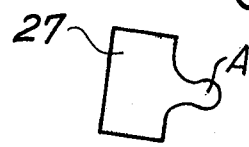
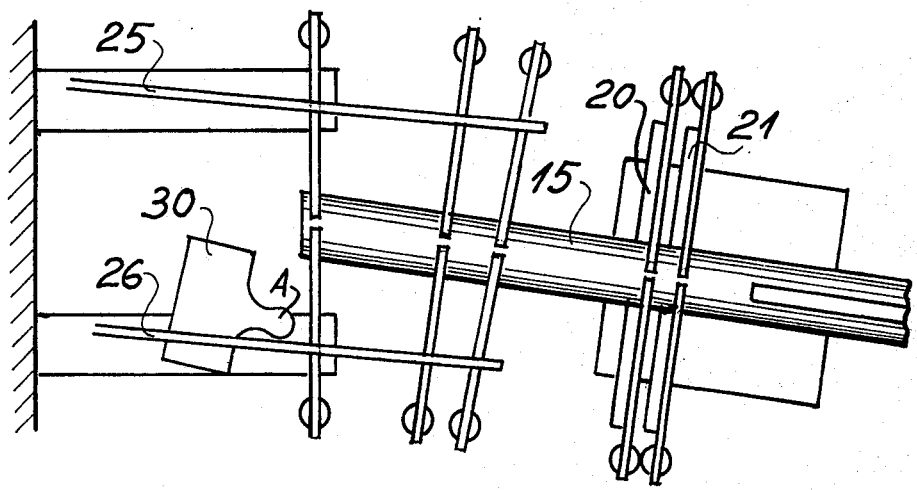

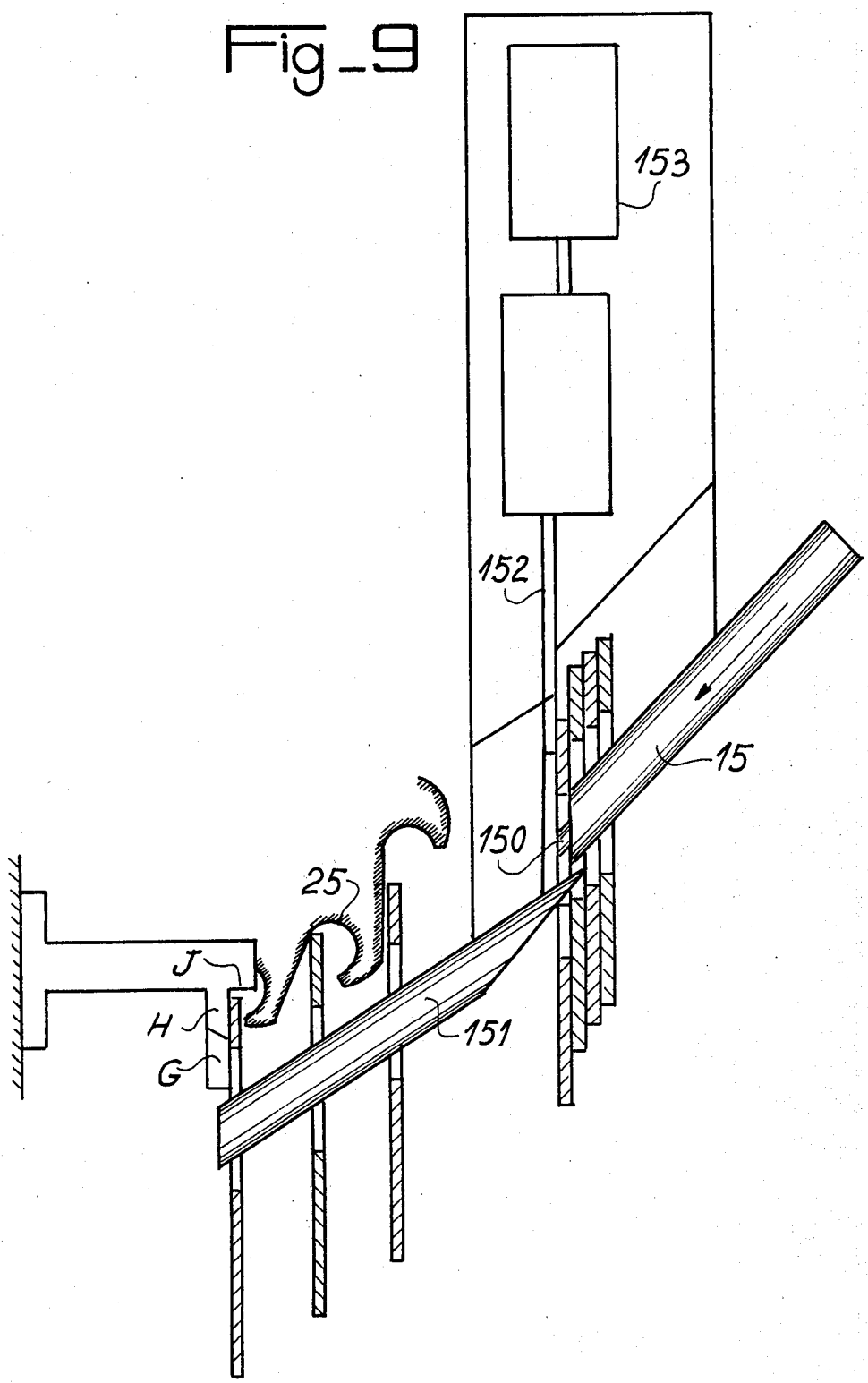

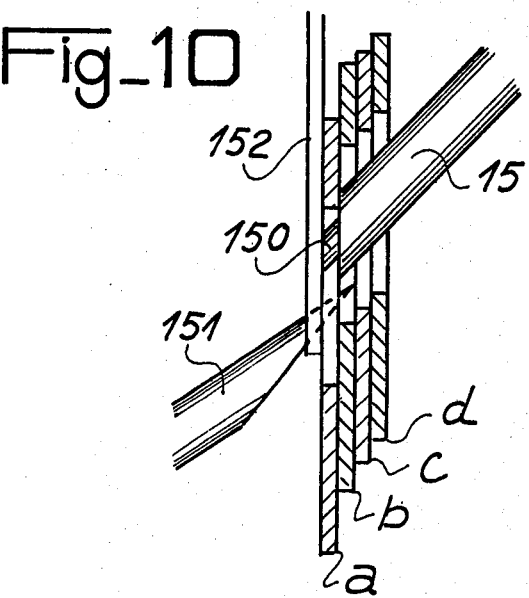
Fig_10
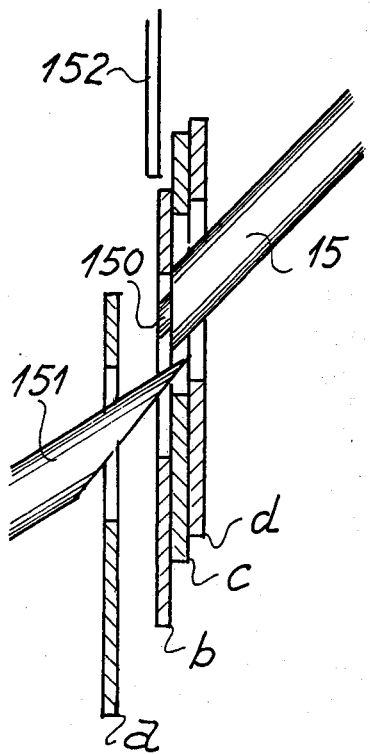
Fig_11
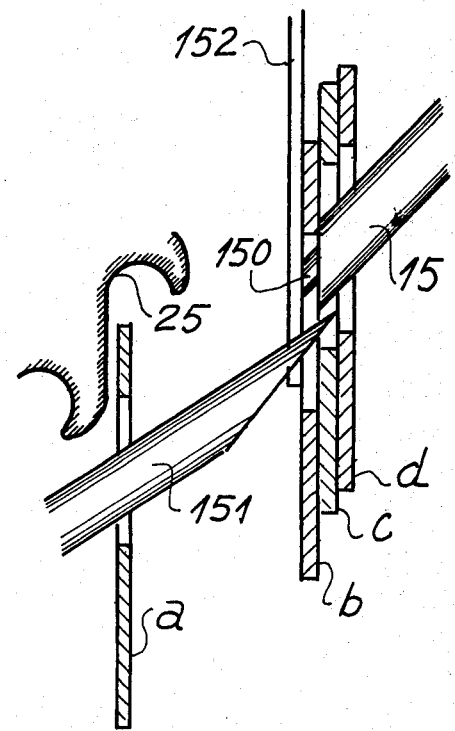
Fig_12

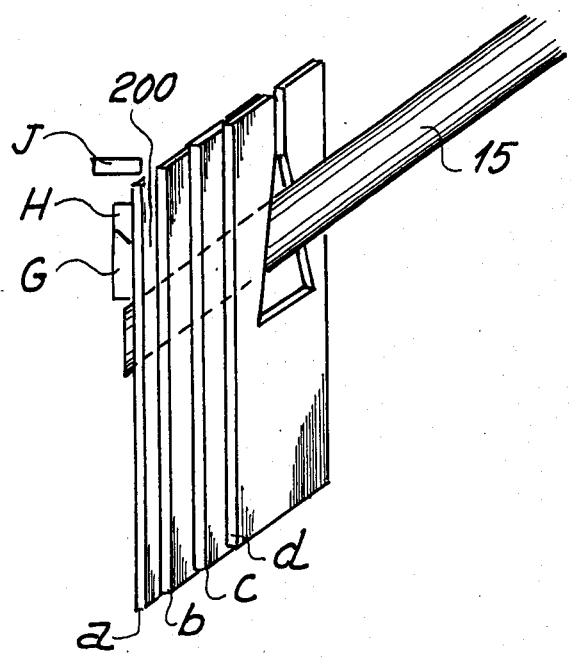
Fig_13
Fig_14
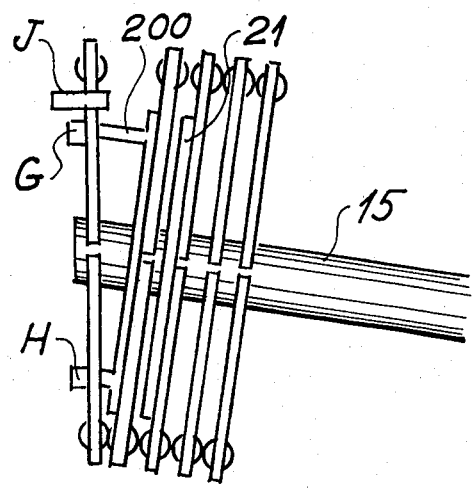
Fig_15

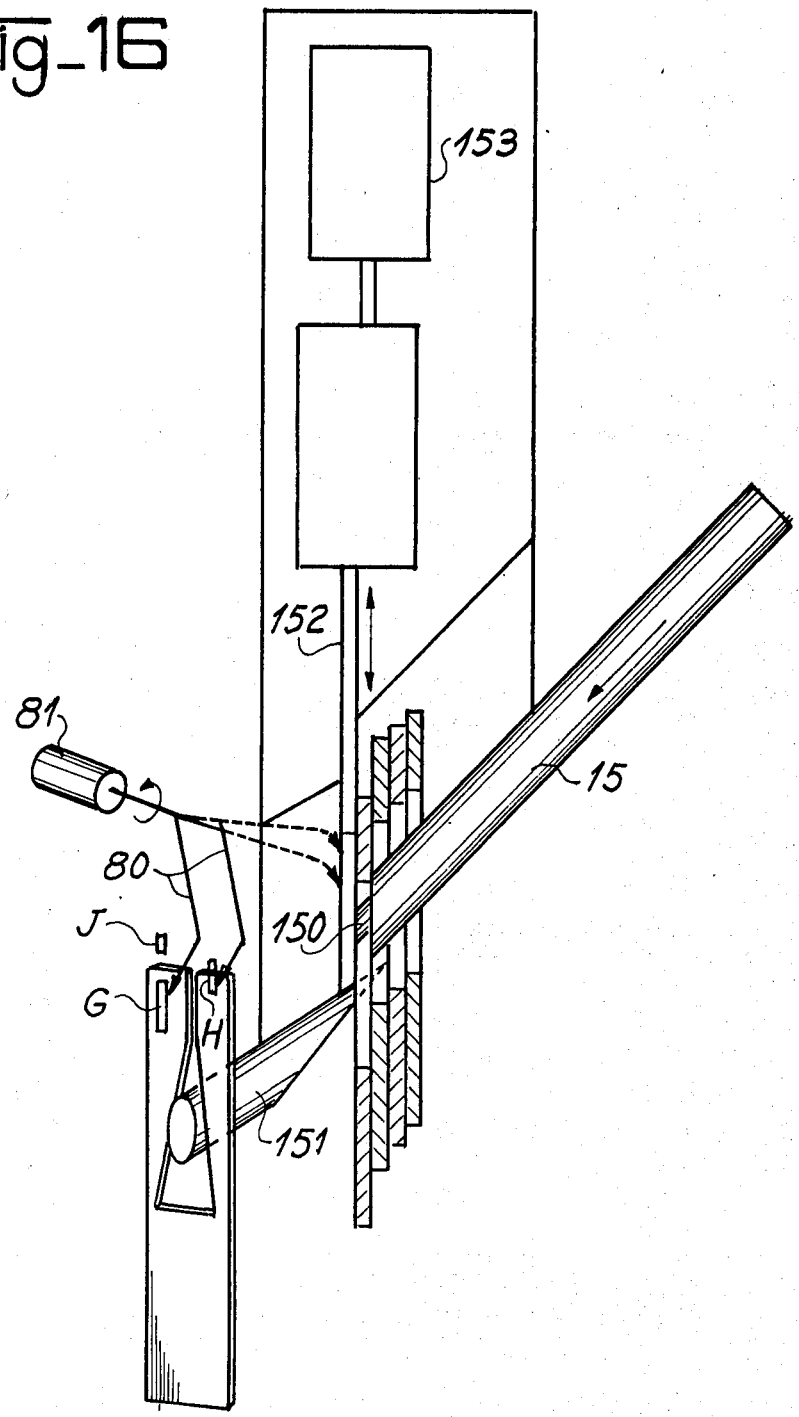

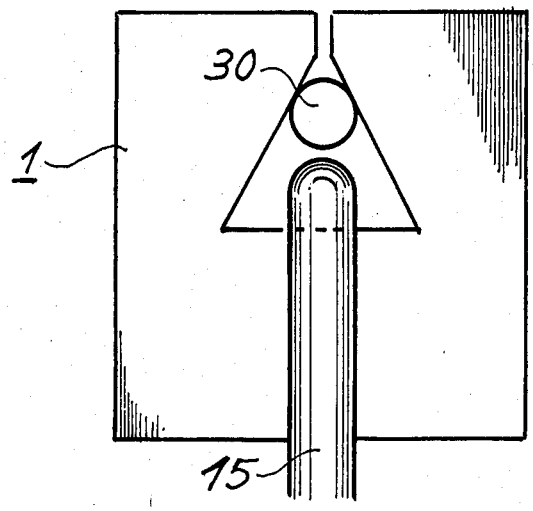
Fig_17
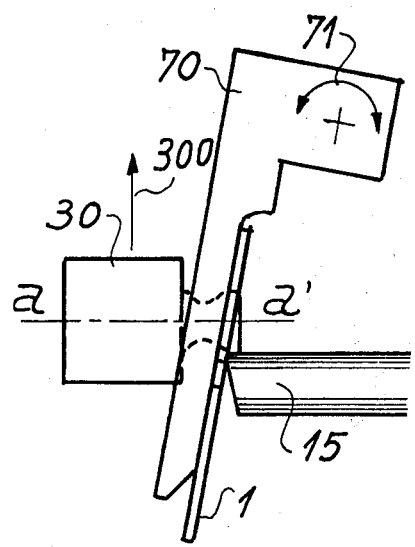
Fig_18
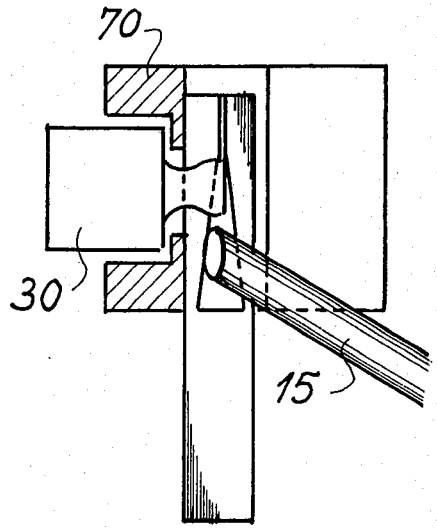
Fig_19

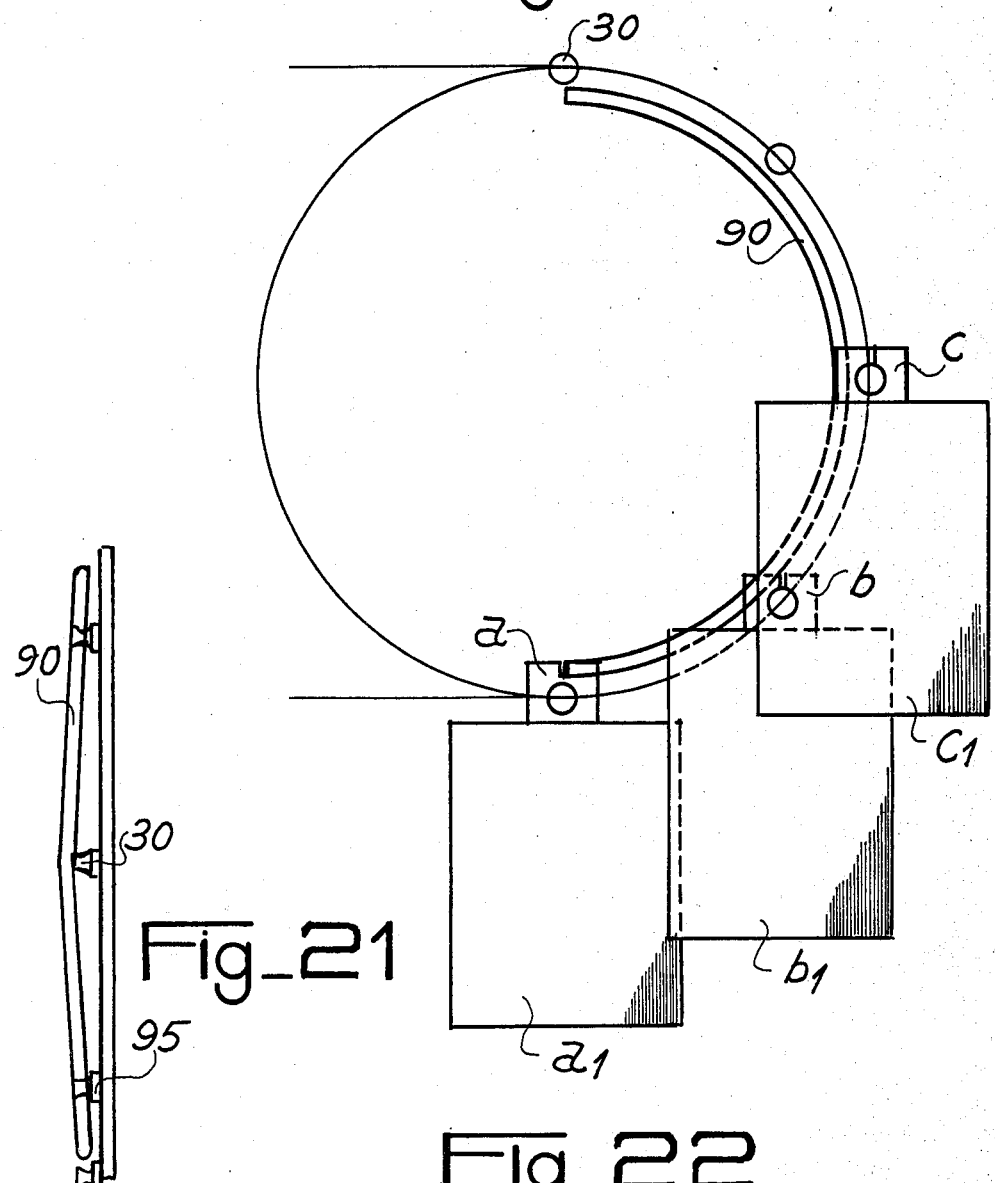
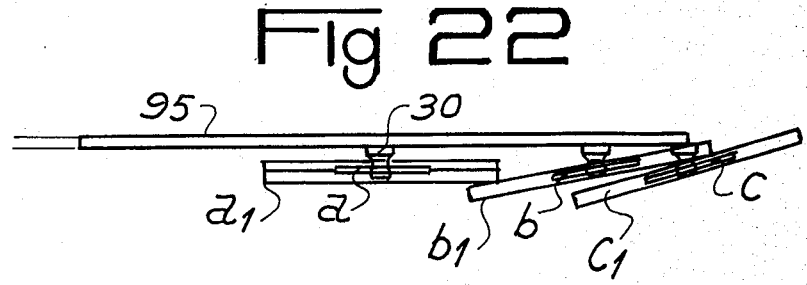

CLIP FOR CARRYING ARTICLES ENGAGING, DISENGAGING AND OVERLAPPING SYSTEM FOR SUCH A CLIP

The invention relates to a clip for carrying articles. It also relates to an engaging, disengaging and overlapping system for such a clip.

There are on the market clips which are devices to which articles are attached either directly or after they have first been placed in packaging. They provide a connection between the articles and a support, which is usually a rod. Devices of this kind are found for example in display racks for consumer products. Since they normally remain stationary in use there are scarcely any problems in designing them.

If on the other hand it is desired to put them into use on a handling line, the clips have to meet a number of requirements. They need to be capable of being stored easily, of being extracted from the storage supports, which are often fixed, in order to be placed on moving transfer means, and then of being unhooked again and so on. As will be explained below, there is a likelihood of their undergoing at least one overlapping operation during the transfer.

The above problems are difficult ones which the present invention aims to solve. The invention relates in particular to a clip for carrying articles which forms a member providing a connection between the article and a support, the said clip containing an opening through which the support is inserted, characterised in that the said opening terminates in a slot and has an outline shape which on the one hand defines an area of decreasing size from the slot to the bottom of the opening, thus allowing the said support to be inserted "on the fly", and which on the other hand results in a configuration of the walls being conducive to sliding on the said support after insertion and until a state of equilibrium is established, the said device being made of a material which possesses on the one hand a resilience capable of producing a spring effect which tends to return the two parts of the clip situated on either side of the slot to the same plane whatever the stresses to which they are subjected, and which on the other possesses a coefficient of friction which promotes the said sliding.

The invention will be better understood from the following explanation and the accompanying Figures, in which:

FIGS. 1 and 2 are front and side views respectively of a clip according to the invention, FIGS. 3 and 4 show a clip of this kind provided with bosses, FIG. 5 and FIG. 6, which is a cross section through FIG. 5 on line $FF_1$, show a clip according to the invention threaded onto a storage rod, FIGS. 7 and 8 show an embodiment of a system for engaging clips according to the invention which are provided with bosses, FIG. 9 shows a modified embodiment of an individual dispenser adapted for clips without bosses, FIGS. 10, 11 to 12 illustrate the operation of the device of FIG. 9, FIGS. 13, 14 and 15 show a modified embodiment of an engaging device proper adapted to clips provided with bosses.

FIG. 16 shows a modified embodiment of an engaging device proper adapted for clips without bosses, FIGS. 17, 18 and 19 illustrate a device for disengaging a clip according to the invention, FIGS. 20, 21 and 22 show an overlapping system for clips according to the invention.

As has already been stated above, a clip according to the invention acts as a connection between one or more articles and a storage or transfer means termed a "support". The articles concerned may be of any kind (envelopes, packages, cardboard boxes, cards etc . . . ). The articles are attached to the clip by any known means while an opening formed in the clip enables the support to be inserted in it.

In accordance with the present invention, such a clip is principally characterised by the combination which is arrived at between the material selected to form it and the particular configuration with which it is endowed to enable it to be engaged and disengaged and possibly to enable a plurality of clips to be overlapped, which operations are capable of being performed under even the most difficult conditions, namely in cases where they have to be performed automatically and on the fly.

Such a clip 1 according to the invention is shown from the front in FIG. 1 and from the side in FIG. 2. The clip 1 concerned has a thickness e (see FIG. 2) and an outline shape, when seen from the front as shown in FIG. 1, which is substantially square, although in fact it could be of some other shape.

In accordance with the invention, an opening 4 is formed entirely through the clip, of an outline shape 5 which produces an open slot 6 preferably at the centre of the upper side of the clip. The outline shape of this opening is extremely important: it must in fact contribute to the performance of at least two essential functions. On the one hand it must mark out an opening which is sufficiently large to enable a storage or transfer means termed a "support" to enter it easily even if the clip and the support are subject to pronounced movement relative to one another (an operation performed on the fly). On the other hand, it must result in the configuration of the walls being such as to assist the clip in sliding on its support until a state of equilibrium is reached. A progressively altering outline shape which defines an area which decreases from the slot to the base AB of the opening meets this condition, and it is for this reason that the triangular outline shape shown in FIG. 1 for the opening 4 is particularly suitable to allow these two functions to be performed. In effect, the base AB of the triangle may be selected to suit the application envisaged and may thus ensure that the conditions required for the performance of the first function are met (entry of the support on the fly). Allowance is made in each case for the size of the support.

The sides of the triangle which form the walls of the opening have an inclination which is similarly adaptable to the application envisaged and which is capable of promoting the sliding mentioned above. The apex of the triangle coincides with the slot 6, whose cross-sectional area is less than that of the support. The slot defines two parts $P_1$ and $P_2$ which are situated on either side of a plane which passes for example through the axis XY of the slot, By virtue of the presence of the slot the two parts may be shifted away from this plane in opposite directions from one another, thus leaving an open space which assists in disengaging the clip. However, to enable this to be done properly, which is where the nature of the material comes into play, it is necessary for the material first of all to have a sufficiently high coefficient of elasticity for the deformation not to be permanent, bearing in mind the thickness e of the clip, the clip then automatically regaining its initial shape at the end of the disengaging operation by spring action no matter what the stresses to which parts $P_1$ and $P_2$ have been subjected. However, it is also necessary for the material to have a low coefficient of friction so that it does not prevent the clip from sliding and indeed promotes such sliding. There are on the market plastics materials which meet these requirements and which are easy to fashion by injection, stamping or moulding. The slot performs another important function which will be explained below.

FIG. 3 which is a front view, and FIG. 4 which is a side view, show a modified version of a clip according to the invention as described with reference to FIGS. 1 and 2. In this case, in addition to the means described above (material, outline shape of the opening and slot) the clip has bosses such as 10 and 11 which are capable of acting as spacers in cases where a series of clips is in use and where the clips must be held at a predetermined distance from one another.

FIG. 5 and FIG. 6 which is a cross section through FIG. 5 on line $FF_1$ show a clip 1 threaded onto a support, which is for example a rod 15 which acts as a carrier or storage means during transfer operations. These Figures illustrate another important function of the slot 6. In effect, in many applications the rods 15, which are intended to carry a large number of clips 1, have to be properly supported by a rigid frame 16. For this purpose a support member 17 for the rod 16, whose thickness is compatible with the slot 6 in the clip, provides a connection between the frame and the rod without hampering the insertion of the clip on the rod. It may have a part 18 similar to a ploughshare which thus, in conjunction with the slot 6, ensures that the clip 1 is properly centralised.

As was stated above, there are many possible applications for the clips according to the invention. They may in particular be used for transferring articles fitted with them from a first fixed support such as a storage rod to any other means intended to carry them, for example to a second, moving support which is a pick-up dog of a transfer system moving at a certain speed, without the transfer being interrupted. FIGS. 7 and 8 show an embodiment of a system for engaging clips according to the invention and in particular clips having bosses such as were described with reference to FIGS. 3 and 4. Such a system includes an individual dispenser which co-operates with the engaging device proper.

The dispenser receives clips which are situated one behind the other on an inclined rod 15, the first clip (a) coming to bear against a first gate 20 and the second gate 21 being raised.

The first gate 20 is lowered between the first clip and the second clip which follows it, and holds back the second clip while the first clip is released when the second gate 20 is raised.

These two gates are connected by a system of levers which in turn is controlled by an electromagnet 22.

The alternating movement of the two gates ensures that the clips are dispensed one by one at the required time.

The "on the fly" engaging device proper, which receives the clips one by one from the rod 15, is formed by two ratchet wheels 25 and 26 (sprockets) in an embodiment which is given here by way of entirely non-limiting example, against which the clips come into abutment so that they can then be driven along by the said wheels. What is here involved is a member for thrusting the clips towards a set of abutments, as will be more clearly explained below. The wheels are of different diameters, have the same number of teeth, and are locked to the same shaft, which is inclined to the path of the dogs intended to receive the clips and also to the axis of the rod. They are driven by a "step-by-step" motor or any other indexing and ratchet system. The shape of the teeth is a special one in that it is suited to receiving the clips, and thus the articles, individually and, in accordance with the invention, to thrusting them against abutments (H and G), which form an angle of less than 90° with the axis of the rod. The result is that the clips occupy an inclined position, which is essential to accomplish the function of engaging the clips on moving supports on the fly, the supports being such as the extension A of dog 30, which is thus able to enter the triangular aperture in a clip and carry the clip away with it.

To hold the clips in a substantially vertical position while the engagement is taking place, use is made of an abutment (J) which restricts rotation of the clip in a vertical plane, the effect of which is to prevent the clip from swinging wildly about just after it has been transferred onto the dog concerned.

The engagement takes place as follows:

The extension A of dog 30, having entered the triangular aperture in the clip, causes the clip to turn slightly on the rod until the abutment (J) halts this rotation. As the dog continues on its way it moves the edges of the slot in the clip away from one another and the clip escapes both from the end of the rod (15) and from the abutment (H), which is shorter than abutment (G).

As a result of its resilience, the clip resumes its original shape (with the edges of the slot opposite one another) and is thus suspended on the pick-up dog 30. The path of movement of the handling system is perpendicular to the axis of the rod 15.

The drives for the dispenser and the engaging device, which are already synchronised, also need to be synchronised with the passage of an unoccupied dog, so that each clip will already be resting against the abutments (H and G) before the unoccupied dog enters the triangular aperture in the clip which is to be engaged.

A logic control member may for example be provided to prevent a clip from approaching the abutments (H and G) for as long as an unoccupied dog has not been reported by a proximity detector. Under these conditions, engagement is thus automatic. These means for positioning the dog are not shown in FIGS. 7 and 8.

If clips without bosses are used such as are shown in FIGS. 1 and 2, the same result can be obtained from a similar on the fly engaging device which operates with the assistance of a thrust member formed as in the previous embodiment by two ratchet wheels, provided that it cooperates with an individual dispenser adapted for clips without bosses. An embodiment of such a dispenser is shown in FIG. 9, whilst FIGS. 10, 11 and 12 illustrate the various phases of the operation of this dispenser. It includes a steeply inclined storage rod 15 which terminates in a second rod 150 of smaller diameter whose length is between 1 and 2 times the thickness of a clip and which is inclined at the same angle and finally a third less steeply inclined rod 151 which is positioned immediately under the other two so as to enable each clip to travel in succession on the three sections of the rod. The individual dispensing function is accomplished by a swift reciprocating movement on the part of a moving flap 152 which is actuated by a solenoid for example. The travel of the clips along the three rods is illustrated in FIGS. 10, 11 and 12. The engaging device proper is identical to that which has been described with reference to FIGS. 7 and 8.

As is shown in FIG. 10, a series of clips (a), (b), (c), (d) are stored on the storage rod 15. Flap 152 is in the lower position. Clip (a) which is waiting on the smaller rod 150, is held back in a first stage by the flap 152. Clips (b), (c) and (d) are held back by clip (a). In the next step which is illustrated by FIG. 11, the flap is operated and moved to the raised position. Clip (a) is released, while clip (b) drops onto the small pin 150. Flap 152 is then quickly returned to the lower position. As FIG. 12 shows, clip (a) is then taken over by the engaging device which is of the kind which has been described with reference to FIGS. 7 and 8 and which is indicated in FIG. 12 by part of a ratchet wheel 25.

In the embodiments of engaging systems described above, the engaging devices make use of a thrust member formed by two sprockets as a means to thrust the clips against the set of abutments H and G one by one, which abutments cooperate with abutment J to ensure that the clips are engaged correctly.

Other thrust members may be used to perform this function. A second embodiment of an engaging system of this kind will now be described with reference to the next set of Figures. FIGS. 13, 14 and 15 relate to a system of this kind which is particularly adapted to engaging clips provided with bosses. In these Figures are once again seen the set of abutment H, G and J against which the clips (a), (b), (c) and (d) are thrust one by one, but this time they are so thrust by a dispenser of which one of the parts also acts as a thrust member. It is equipped with a first gate 21 and a second gate 200 which, in addition to its gating function, is also able to thrust each of the clips against the abutments H and G and J by virtue of the special structure with which it is endowed, which is shown in FIG. 15 (which is a folded up section of the gates 200). It takes the form of a double wedge, which assists in dispensing the clips individually and moving forward by gravity, thus ensuring that the clips are reliably positioned exactly against their abutments H and G which is essential if the engaging function is to be reliably performed.

FIG. 16 shows an embodiment of an engaging system, without sprockets which is particularly adapted to engaging clips without bosses. In this case the dispenser is of the kind which has been described with reference to FIG. 9. The system also includes a series of rods 15, 150 and 151 and a flap 152 operated by a solenoid 153. However, the member for thrusting the clip which is currently being engaged against the abustments H, G and J is formed by a rotary fork 80. The latter is driven by a small rotary electromagnet 81 whose movements are synchronised with those of the dispenser.

Having described some examples of a system for engaging clips which may or may not be provided with bosses, an embodiment of a system for automatic disengaging will now be described with reference to FIGS. 17, 18 and 19. FIG. 19 is a cross section on (aa') in FIG. 18. The purpose of this system is to transfer clips carrying articles automatically from dogs 30 which are moving in the direction indicated by arrow 300 to a fixed downwardly inclined receiving rod 15. This is achieved by means of a cam 70 of forked configuration. The outline shape of the cam is such that it causes the clips to slide on the dog in question, along its axis, at the time when the receiving rod 15 is opposite the triangular opening in the clip. If the cam is held in a fixed position each clip slides along its straight, inclined face and at the moment when the receiving rod 15 is opposite the triangular opening in the clip, the curved part of the cam 70 brings the disengaging movement to an abrupt end.

Reliability may be increased by causing the cam to rotate backwards as indicated by the double headed arrow 71 at the moment when the rod is opposite the triangular opening of the clip which is currently being disengaged.

A clip according to the invention is easy to engage on the fly and to disengage, automatically, even if there is pronounced relative motion between the part which supports it and that which is to receive it, as has just been described and illustrated. The clips are also capable of undergoing overlapping operations, which are particularly useful and even necessary in certain applications where conveyors are used which change direction. This is the case for example with sorting machines which operate on different levels. The direction of movement of the articles is reversed at each level and the means for engaging the clips always need to move in a vertical plane. It is therefore essential to cause the clips and the articles which they are carrying to move over the top of one another while the pick-up means are rotating through 180°. This operation is defined as being an overlapping operation and it is performed by means of an overlapping system according to the invention without the articles moving apart to any substantial degree.

To achieve this object, as is shown in FIGS. 20, 21 and 22, a guide 90 is concentric with the path of the dogs 30 and of a shape suitable to cause the clips (a), (b), (c) carrying their articles ($a_1$), ($b_1$), ($c_1$) to pivot during part of the rotary movement in order to cause them to rotate slightly on the dog 30, thus providing the overlap, that is to say causing the articles suspended from the clips to overlap one another.

FIG. 22, which clearly shows the beginning of the cam 90 bends in gain to enable the clips to return to their equilibrium position. It should however, be noted that this operation is easier to perform the flatter are the articles.

The change from a high level to a low level takes place in the same way using a guide having a symmetrical outline shape.

As has already been mentioned, a clip according to the invention is intended to carry articles of any kind such as envelopes, pouches and cards which are secured to the clip either by springs, bonding, stapling, or crimping or by any other means which are suitable for the various forms of packing. Given the characteristics of the clips, by means of suitable engaging, disengaging and overlapping systems it becomes possible to use them in many lines for handling and sorting articles. When this is the case, the clips carrying their articles are stored on a fixed rod and are extracted one by one by a transfer device formed by a chain provided with support (dogs) capable of receiving the clips. This chain is set in motion for example by motor driven wheels. An engaging system as described for the present invention allows each of the clips to pass from the storage rod to an unoccupied dog on the line. Having arrived at this destination, the clip may be ejected from the dog carrying it by means of a disengaging system according to the invention. If there is a change of level between the starting point and the arrival point the clips and the articles are acted on by an overlap system according to the invention which enables the articles to overlap one another during the change of level.

Handling installations of this kind are used in many applications such as sorting dispatch wallets for photographs, for sorting documents and various articles, or for grouping articles together.

What is claimed is:

1. A clip for carrying articles which forms a member providing a connection between the article and a support, the said clip containing a triangular shaped opening through which the support is inserted, wherein said opening terminates in a slot and has an outline shape which defines an area of increasing size from the slot to the base of the opening, thus enabling said support to be inserted "on the fly", and which results in a configuration of the walls conducive to sliding movement on the said support after its insertion and until a state of equilibrium has been established, said clip being made of a material which on the one hand has an elasticity capable of producing a spring effect which tends to restore the two parts of the clip situated on either side of the slot to the same plane whatever the stresses to which they are subjected and which on the other hand has a coefficient of friction which promotes the said sliding movement.

2. A carrying clip according to claim 1, wherein the outline shape of said opening is in the form of a triangle whose apex coincides with said slot and whose sides form the walls of said opening.

3. A carrying clip according to claims 2 wherein said slot defines two parts $P_1$ and $P_1$ which are capable of being deformed on either side of a plane and of returning to their original equilibrium position by spring action.

4. A carrying clip according to claim 1 further comprising at least one boss.

5. A system for carrying articles comprising:
a plurality of clips for connection of said articles, each of said clips having an opening, wherein said opening forms a slot at substantially the middle of the top edge of said clip and has increasingly greater width from said slot to the base of said opening, said clip being made of a material which on the one hand has an elasticity capable of producing a spring effect which tends to restore the two parts of the clip situated on either side of said slot to the same plane whatever the stresses to which they are subjected and which on the other hand has a coefficient of friction which promotes sliding movement, said clip further comprising at least one boss; and
an engaging system for transferring clips from a first fixed support to a second moving support having first and second abutments which form an angle of less than 90° with the axis of the first support, said first abutment being shorter than said second abutments, a thrust member for applying single clips against said first and second abutments, means for positioning the second support so that it enters the opening in the clip when the clip is resting against the first and second abutments, and a third abutment for holding the clip in a vertical position while it is moving from the first support to the second support.

6. A system according to claim 5 wherein said presenting means are a dispenser including first and second gates and means for lowering the first gate between the first clip which is on the point of moving from the first support to the second support and a second clip which follows, and for lowering the second gate, which also releases the first clip which is then taken over by the thrust member.

7. A system according to claim 5 wherein said presenting means are a dispenser comprising a first steeply inclined rod which terminates in a second rod of smaller diameter whose length is between one and two times the thickness of the said clip and which is of the same inclination as the first rod, a third rod less steeply inclined than the first and second rods which is positioned immediately below the first and second rod; a flap which is movable with a fast reciprocating movement and which is positioned, in a first stage, in a lowered position to hold back the first clip which is on the point of moving from the first support to the second support and then in a second stage which occupies a raised position, thus releasing the said first clip whilst a second clip which is following drops onto the third rod and finally, in a third stage, which returns to the lowered position fairly quickly in order to hold back the second clip, whilst the first clip is then taken over by the engaging device.

8. A system according to claim 5 wherein said thrust member is formed by two ratchet wheels of different diameters having the same number of teeth which are locked to the same shaft which is inclined to the path followed by the second moving support and also to the axis of the first support, the shape of the teeth assisting in taking over the clips.

9. A system as in claim 5 further including means for transferring the clip from a second moving support on which it is situated to a first fixed support; comprising a cam of forked configuration whose shape causes the clip to slide along the moving support in the direction of the axis at the moment when the fixed support is situated opposite the opening in the said clip.

10. A system as in claim 5 further including means for causing at least the said clip to overlap another clip carried by a movable support, comprising a guide concentric to the path of the said moving support which is of a shape capable of causing the said clip to pivot in such a way as to cause it to rotate slightly in the said moving carrier.

* * * * *